(12) United States Patent
Rarick

(10) Patent No.: US 9,612,800 B2
(45) Date of Patent: Apr. 4, 2017

(54) IMPLEMENTING A SQUARE ROOT OPERATION IN A COMPUTER SYSTEM

(71) Applicant: Imagination Technologies, Limited, Kings Langley (GB)

(72) Inventor: Leonard Rarick, San Diego, CA (US)

(73) Assignee: Imagination Technologies Limited, Kings Langley (GB)

( * ) Notice: Subject to any disclaimer, the term of this patent is extended or adjusted under 35 U.S.C. 154(b) by 249 days.

(21) Appl. No.: 14/452,358

(22) Filed: Aug. 5, 2014

(65) Prior Publication Data
US 2016/0041947 A1  Feb. 11, 2016

(51) Int. Cl.
*G06F 7/38* (2006.01)
*G06F 7/552* (2006.01)

(52) U.S. Cl.
CPC .... *G06F 7/5525* (2013.01); *G06F 2207/5355* (2013.01)

(58) Field of Classification Search
CPC .................................................... G06F 7/5525
USPC ....................................................... 708/605
See application file for complete search history.

(56) References Cited

U.S. PATENT DOCUMENTS

| | | | | |
|---|---|---|---|---|
| 5,060,182 A | * | 10/1991 | Briggs .................. | G06F 7/5525 708/605 |
| 5,206,823 A | | 4/1993 | Hesson | |
| 5,268,857 A | * | 12/1993 | Chen ..................... | G06F 7/5525 708/605 |
| 5,341,321 A | * | 8/1994 | Karp ...................... | G06F 7/5525 708/500 |
| 5,386,375 A | * | 1/1995 | Smith .................... | G06F 7/5525 708/500 |
| 7,599,980 B1 | * | 10/2009 | Rarick .................. | G06F 7/5525 708/605 |
| 7,599,982 B1 | | 10/2009 | Rarick | |
| 2012/0011182 A1 | * | 1/2012 | Raafat .................... | G06F 7/491 708/205 |

FOREIGN PATENT DOCUMENTS

EP   1335278   8/2003

OTHER PUBLICATIONS

Search and Examination Report, United Kingdom Intellectual Property Office, GB1513861.3, Feb. 1, 2016, pp. 1-8.

* cited by examiner

*Primary Examiner* — Tan V. Mai
(74) *Attorney, Agent, or Firm* — Vorys, Sater, Seymour Pease LLP; Vincent M DeLuca

(57) ABSTRACT

A method and computer system are provided for implementing a square root operation using an iterative converging approximation technique. The method includes fewer computations than conventional methods, and only includes computations which are simple to implement in hardware on a computer system, such as multiplication, addition, subtraction and shifting. Therefore, the methods described herein are adapted specifically for being performed on a computer system, e.g. in hardware, and allow the computer system to perform a square root operation with low latency and with low power consumption.

18 Claims, 3 Drawing Sheets

IMPLEMENTING A SQUARE ROOT OPERATION IN A COMPUTER SYSTEM

BACKGROUND

There are many situations in which a computer system needs to perform a square root operation. To give just some examples, numerical analysis, complex number computations, statistical analysis, computer graphics, and signal processing are among the fields where square root operations are often performed by computer systems. There are many different ways in which a computer system may implement a square root operation. For example a square root may be computed in a digit-by-digit manner, such as in restoring, non-restoring, and SRT (named after its creators: Sweeney, Robertson and Tocher) techniques. However, iterative converging approximation methods are often faster in determining the result of a square root operation to a defined number of bits of accuracy. Examples of iterative converging approximation techniques used are the Newton-Raphson and Goldschmidt techniques, which start with an initial estimation of the square root or its inverse and then iteratively converge on a better solution. Also, the detailed implementation of these iterative techniques can be done with different factorizations of the basic equations. Further, initial approximations may be obtained by various methods, such as bipartite lookup tables and ITY (Ito-Takagi-Yajima) initial approximation algorithms.

In general, the Newton Raphson technique can be used to find the value of a function, say $g(z)$, for some particular input value of z, called b. It may be the case that the function $g(z)$ cannot easily be computed directly (e.g. if the function is a square root operation), and in that case a different function, let's call it $f(x)$, is used wherein $f(g(b))=0$. The Newton-Raphson technique is an example of an iterative converging approximation technique which is good for finding a zero of a function, and if it is applied to the function $f(x)$, then a value for $g(b)$ can be determined, by finding the value of x at which $f(x)=0$. For example, if the function $g(z)$ is a square root operation, $g(z)=\sqrt{z}$, then the function $f(x)$ may be chosen to be $f(x)=b-x^2$, because this function equals zero when $x=\sqrt{b}$. There are other options for functions $f(x)$ that would equal zero when $x=\sqrt{b}$.

The general principles of the Newton-Raphson method are well known in the art, but a brief explanation is given here to aid the understanding of the following examples. The Newton-Raphson method starts with an initial guess (denoted $p_0$) for a zero of the function $f(x)$. The initial guess is typically close to, but not exactly equal to, the correct answer, such that $f(p_0) \neq 0$, so $p_0 \neq g(b)$. From the point $(p_0, f(p_0))$, the tangent to the curve $f(x)$ is determined and then the value of x at which the tangent intersects the x-axis is found. The slope of the curve $f(x)$ is given by the derivative of $f(x)$, by the equation:

$$f'(x) = \frac{d}{dx}(f(x)). \quad (1)$$

The point $(p,q)=(p_0,f(p_0))$ and the slope $m=f'(p_0)$ determines the line of the tangent according to the equation:

$$y=mx+b=mx+q-mp=xf'(p_0)+f(p_0)-p_0 f'(p_0). \quad (2)$$

The straight line defined by equation 2 is a local approximation to the curve $f(x)$. Thus, the value of x where this line crosses the x-axis is similar to the value of x where $f(x)$ crosses the x-axis. Hence, the value of x where this line crosses the x-axis is a better approximation than $p_0$ to the value of x where $f(x)=0$. So the value of x where the line crosses the x-axis is used as the next approximation, $p_1$, of the zero of $f(x)$, i.e. the next approximation of $g(b)$. To find where the line of equation 2 intersects the x-axis, y is set to zero and the equation is solved to find x such that:

$$x = p_0 - \frac{f(p_0)}{f'(p_0)}. \quad (3)$$

This method is iterated to repeatedly find better approximations of the zero of the function until a desired accuracy of the result is achieved. For example, the desired result may be a single precision floating point number in which case at least 24 bits of precision are desired; or the desired result may be a double precision floating point number in which case at least 53 bits of precision are desired. Therefore, over a sequence of iterations, the method will determine the approximations as:

$$p_1 = p_0 - \frac{f(p_0)}{f'(p_0)}$$

$$p_2 = p_1 - \frac{f(p_1)}{f'(p_1)}$$

$$p_3 = p_2 - \frac{f(p_2)}{f'(p_2)}$$

and in general for the $(i+1)^{th}$ iteration:

$$p_{i+1} = p_i - \frac{f(p_i)}{f'(p_i)} \quad (4)$$

Each iteration provides a better approximation than the previous iteration for the zero of the function $f(x)$.

As well as ensuring that an accurate solution is provided, other considerations when choosing how to implement an operation in a computer system are how long the operation will take (i.e. the latency of the operation) and the power consumption of performing the operation on the computer system. These considerations are particularly important in computer systems which have particularly limited processing resources, e.g. on mobile devices, for which the processing power is preferably kept low to avoid draining a battery and/or to avoid excess heat generation. Furthermore, the operations often need to be performed in real-time (e.g. when a user is waiting for a response which depends upon the result of the operation, e.g. when the user is playing a game which uses a graphics processor which needs to perform a particular operation (e.g. a square root operation)), and in these cases the latency of the operation is important. Therefore, any improvement to the speed and/or power consumption of operations, such as square root operations, performed on computer systems may be of significant benefit.

Some mathematical operations are simple to perform in hardware, such as addition, subtraction, multiplication and shifting. However, other mathematical operations are not so simple to perform in hardware such as division and performing a square root. If an iterative converging approximation technique such as the Newton-Raphson technique is used to find the result of a square root operation, some known functions to be used by the Newton Raphson technique for performing a square root would involve performing division computations. For example, if the Newton Raphson method is performed on the function $f(x)=b\,x^2$ then equation 4 becomes:

$$p_{i+1} = p_i + \frac{b}{2x} - \frac{x}{2}. \quad (5)$$

Implementing equation 5 would involve a division by x, and as such is not simple to compute in a computer system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of implementing a square root operation in a computer system to determine a value of $\sqrt{b}$, where b is an input value, the method using an iterative converging approximation technique for determining converging approximations of $$\frac{1}{\sqrt{b}},$$

the method comprising: obtaining an initial approximation of $$\frac{1}{\sqrt{b}};$$

and implementing one or more iterations of the iterative converging approximation technique using multiplier logic of the computer system, wherein a concluding iteration of the one or more iterations of the iterative converging approximation technique comprises: (i) performing a first computation with the multiplier logic of the computer system to determine a first intermediate parameter $r_c$ for the concluding iteration based on a multiplication of the input value b with a previous approximation of $$\frac{1}{\sqrt{b}};$$

(ii) performing a second computation with the multiplier logic to determine a second intermediate parameter $s_c$ for the concluding iteration based on a multiplication of the first intermediate parameter $r_c$ for the concluding iteration with the previous approximation of $$\frac{1}{\sqrt{b}};$$

and (iii) performing a concluding computation with the multiplier logic to determine the value of $\sqrt{b}$ based on a multiplication of the first intermediate parameter $r_c$ for the concluding iteration with the second intermediate parameter $s_c$ for the concluding iteration.

There is also provided a computer system configured to implement a square root operation to determine a value of $\sqrt{b}$, where b is an input value, the computer system comprising an iterative converging approximation module arranged to receive an initial approximation of $$\frac{1}{\sqrt{b}}$$

and configured to use an iterative converging approximation technique for determining converging approximations of $$\frac{1}{\sqrt{b}},$$

the iterative converging approximation module comprising multiplier logic; wherein the iterative converging approximation module is configured to implement one or more iterations of the iterative converging approximation technique using the multiplier logic, wherein to implement a concluding iteration of the one or more iterations of the iterative converging approximation technique the iterative converging approximation module is configured to: (i) perform a first computation with the multiplier logic to determine a first intermediate parameter $r_c$ for the concluding iteration based on a multiplication of the input value b with a previous approximation of $$\frac{1}{\sqrt{b}};$$

(ii) perform a second computation with the multiplier logic to determine a second intermediate parameter $s_c$ for the concluding iteration based on a multiplication of the first intermediate parameter $r_c$ for the concluding iteration with the previous approximation of $$\frac{1}{\sqrt{b}};$$

and (iii) perform a concluding computation with the multiplier logic to determine the value of $\sqrt{b}$ based on a multiplication of the first intermediate parameter $r_c$ for the concluding iteration with the second intermediate parameter $s_c$ for the concluding iteration.

There may further be provided computer readable code for generating a computer system according to any of the examples described herein. Furthermore, there may be provided computer readable code adapted to perform the steps of any of the methods described herein when the code is run on a computer. The computer readable code may be encoded in a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
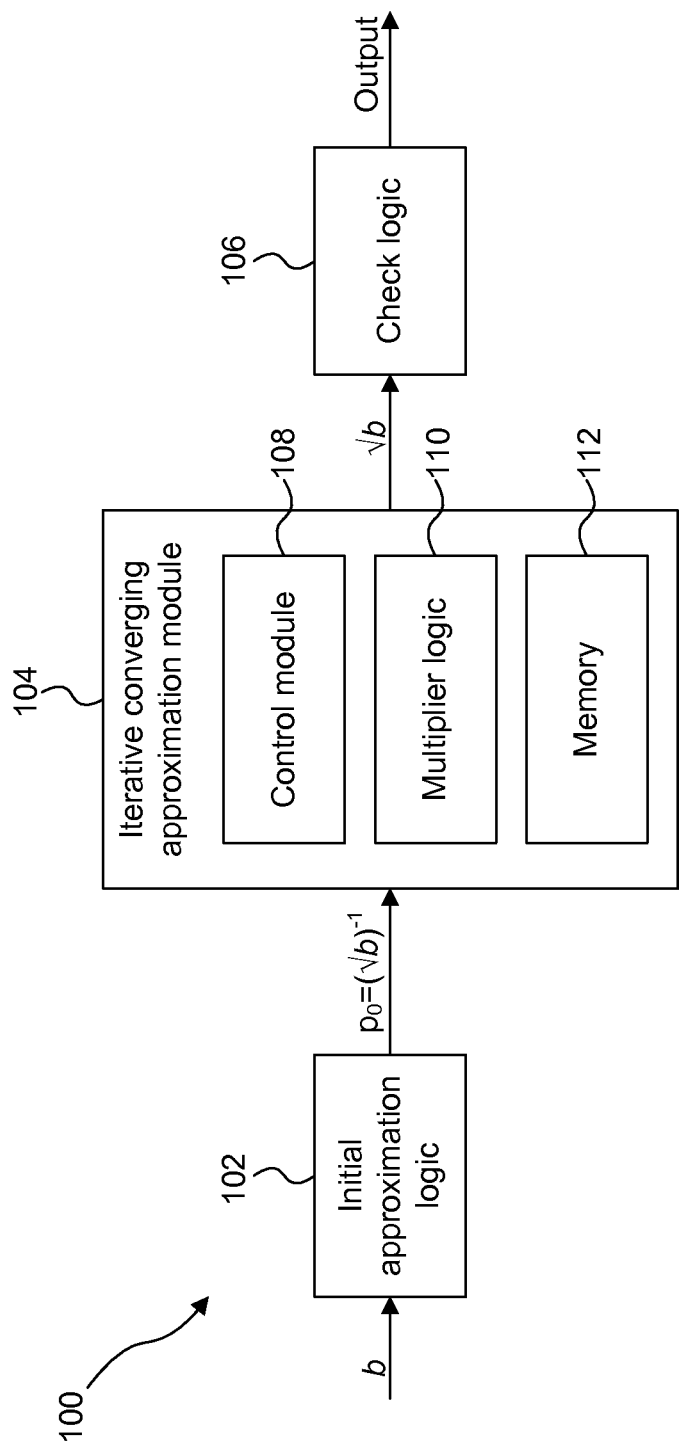
FIG. 1 is a schematic diagram of a computer system for implementing a square root operation.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The examples described herein provide a method for finding the result of a square root operation to a desired level of accuracy (i.e. to a desired number of bits of accuracy) using an iterative converging approximation technique which includes fewer computations than conventional methods, and only includes computations which are simple to implement in hardware on a computer system, such as multiplication, addition, subtraction and shifting. Therefore, the methods described herein allow a computer system to perform a square root operation with lower latency and with lower power consumption than conventional methods. This can provide a significant benefit, particularly in computer systems which have limited processing resources, e.g. on mobile devices such as smart phones or tablets. It is noted that square root operations are very common in many different computer applications, so even a small improvement in the way in which a computer system can implement a square root operation may provide a significant benefit.

FIG. 1 shows an example of a computer system 100 for implementing a square root operation. The computer system 100 may be implemented in hardware. Implementing the system 100 in hardware may allow for faster computation. The computer system 100 comprises initial approximation logic 102, an iterative converging approximation module 104, and check logic 106. The iterative converging approximation module 104 comprises a control module 108, multiplier logic 110 and a memory 112. In some examples, the logic and modules shown in FIG. 1 are implemented in hardware, e.g. as fixed function circuitry in a computer processor. Each logic block and module shown in FIG. 1 may be implemented as one or more units within the computer system 100. The system 100 is arranged to receive an input value b. In particular, the initial approximation logic 102 is arranged to receive the input value b. An output of the initial approximation logic 102 is coupled to an input of the iterative converging approximation module 104, for providing an initial approximation of $$\frac{1}{\sqrt{b}}$$

to the iterative converging approximation module 104. An output of the iterative converging approximation module 104 is coupled to an input of the check logic 106 for providing a determined value of $\sqrt{b}$ to the check logic 106.

An output of the check logic 106 is arranged to provide output of the system 100 as the correctly rounded determined value of $\sqrt{b}$.

The operation of the computer system 100 is described with reference to FIG. 2 which shows a method of implementing a square root operation in the computer system 100. In step S202 an input value b is received at the initial approximation logic 102. In some examples, the system 100 may comprise scaling logic which scales an initial input value by an even power of two such that the input value b received at the initial approximation logic 102 is in the range $1 \leq b < 4$. In those examples, further scaling logic may be provided in the system 100 to scale the output from the check logic 106 to reverse the scaling performed before the input value b is passed to the initial approximation logic 102. For example, if an initial input value is scaled by a factor of ¼ to determine the input value b then the determined value of $\sqrt{b}$ output from the check logic 106 is scaled by a factor of 2 to determine the square root of the initial input value. Such scaling and reverse scaling would be apparent to those skilled in the art, and can be implemented such that $1 \leq b < 4$. Since the scaling is by an even power of two then both the scaling and the reverse scaling can be achieved by changing exponents.

The examples described below relate to the Newton Raphson technique, but any other suitable iterative converging approximation technique could be used. As described above, if the Newton Raphson technique is used to determine the zeroes of the function $f(x)=b-x^2$ then, according to equation 5, a division operation would be needed, making the computation not simple to implement in hardware in the computer system 100. So instead, it is noted that $$\sqrt{b} = \frac{b}{\sqrt{b}},$$

and the Newton Raphson method can be used to find a value of $$\frac{1}{\sqrt{b}},$$

which can then be multiplied by b to thereby find a value of $\sqrt{b}$. Therefore, in order to implement the Newton Raphson technique, a function f(x) is used whereby $$f\left(\frac{1}{\sqrt{b}}\right) = 0.$$

There are many functions which could be used, but in the examples described herein, a function $$f(x) = b - \frac{1}{x^2}$$

is used. Therefore, $$f'(x) = \frac{2}{x^3}.$$

This means that, in accordance with equation 4 given above, the Newton Raphson method involves computing, on the $(i+1)^{th}$ iteration, an approximation of $$\frac{1}{\sqrt{b}},$$

denoted $p_{i+1}$, according to the equation:

$$p_{i+1} = p_i \frac{3 - bp_i^2}{2}. \quad (6)$$

So, for example, $$p_1 = p_0 \left( \frac{3 - bp_0^2}{2} \right)$$

is a better approximation than $p_0$ to $$\frac{1}{\sqrt{b}}.$$

It is noted that the computations involved in performing an iteration according to equation 6 are simple to implement in a computer system, e.g. they comprise multiplication, subtraction and shifting. The only division involved in an iteration is division by two which can be accomplished (in binary) with a shift instead of a divide, and shift operations are trivial to implement.

Therefore, in step S204 the initial approximation logic 102 computes an initial approximation of $$\frac{1}{\sqrt{b}},$$

denoted $p_0$. There are various approaches which may be used to compute the initial approximation of $$\frac{1}{\sqrt{b}},$$

such as a simple table lookup, using parallel table lookups and combining the results, or using a table lookup followed by a multiply to implement an ITY algorithm. For example, the initial approximation $p_0$ may have at least three bits of accuracy. The initial approximation $p_0$ is provided to the iterative converging approximation module 104.

In other examples, the system 100 may receive an initial approximation of $$\frac{1}{\sqrt{b}}$$

which has been determined outside of the system 100. The initial approximation may in that case be passed to the iterative converging approximation module 104 and there would be no need to implement the initial approximation logic 102 in the system 100. In general, the system 100 obtains an initial approximation of $$\frac{1}{\sqrt{b}}$$

(e.g. by either determining it or receiving it), and provides the initial approximation to the iterative converging approximation module 104.

Figure 2:
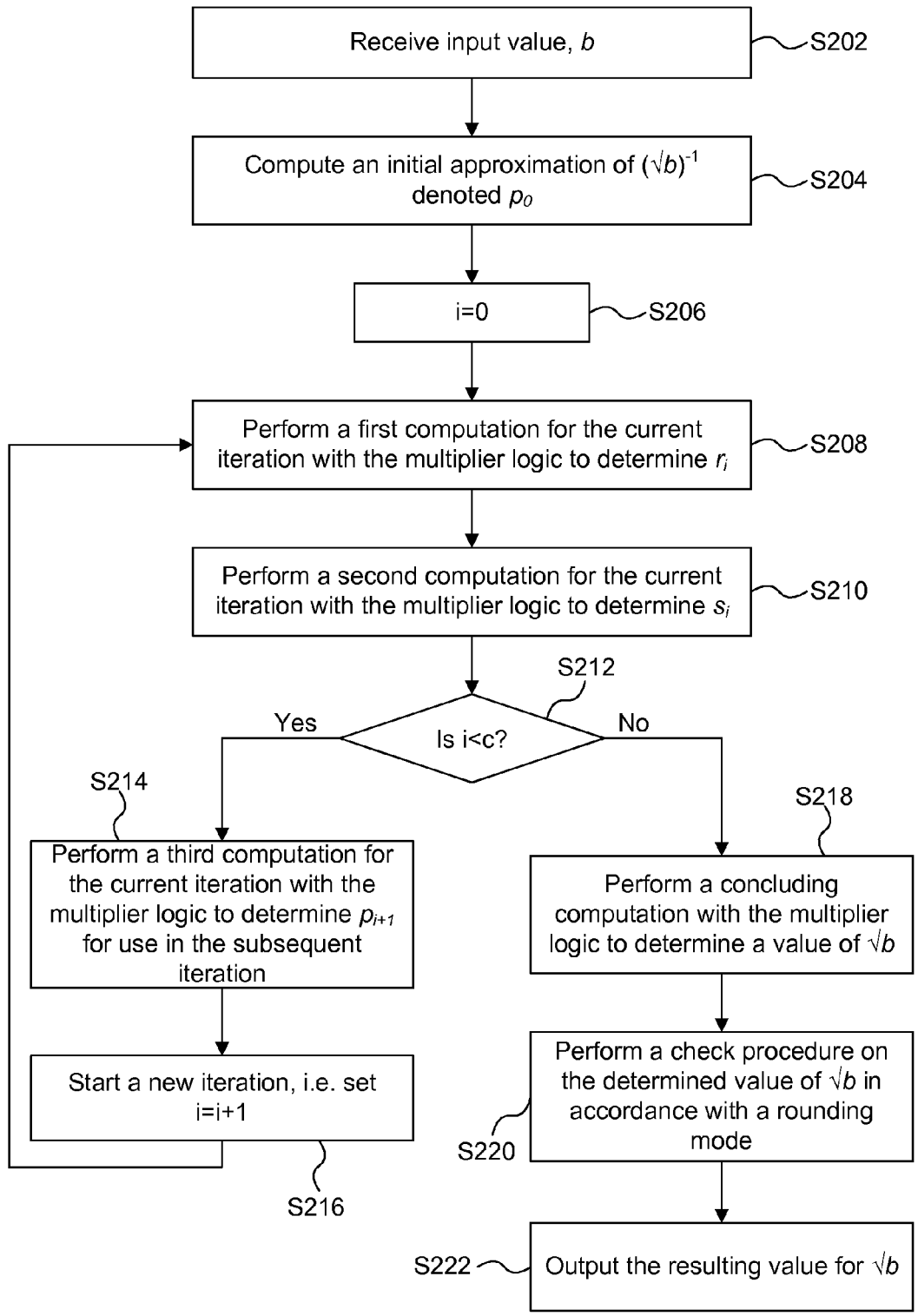
FIG. 2 is a flow chart for a method of implementing a square root operation in a computer system.

Steps S206 to S218 of the method shown in FIG. 2 are implemented in the iterative converging approximation module 104 in order to determine a value of $\sqrt{b}$. The multiplier logic 110 may be implemented as a binary multiplier which multiplies numbers together using binary adders, e.g. by computing a set of partial products and then summing the partial products together. It is therefore simple to implement multiply, add, subtract and shift operations in the multiplier logic 110. The control module 108 controls the operation of the iterative converging approximation module 104 so as to perform the iterative converging approximation technique (e.g. the Newton Raphson technique) for determining converging approximations of $$\frac{1}{\sqrt{b}}.$$

The memory 112 is used to store values for subsequent use, e.g. to store intermediate parameters and/or to store approximations of $$\frac{1}{\sqrt{b}},$$

as will become apparent from the description of the examples below.

In step S206 the iterative converging approximation module 104 (e.g. the control module 108) sets i=0. i is an index, wherein (i+1) denotes the current iteration. The control module 108 keeps track of which iteration is being implemented, and controls the number of iterations which are performed before a value is outputted form the iterative converging approximation module 104.

The iterative converging approximation module 104 receives the input value b and the initial approximation $p_0$ and stores these values in the memory 112. Each iteration of the iterative converging approximation technique comprises computations including three (and only three in this example) multiplies performed by the multiplier logic 110 of the iterative converging approximation module 104. On each computation, the multiplier logic 110 is capable of performing a multiply operation and/or one or more add/subtract operations and/or a shift operation. On each non-concluding iteration (i.e. where i<c), the iterative converging approximation module 104 determines a value of $p_{i+1}$ in accordance with equation 6 using the values of $p_i$ and b. In order to do this, in step S208 a first computation is performed for the current iteration with the multiplier logic 110 to determine a first intermediate parameter, $r_i$, based on a multiplication of the input value b with the value $p_i$ which is the previous approximation of On the first iteration (when i=0) the previous approximation of $$\frac{1}{\sqrt{b}}$$

is the initial approximation $p_0$. As an example, the first intermediate parameter, $r_i$, may be determined according to the equation:

$$r_i = b p_i. \tag{7}$$

The determined value of the first intermediate parameter, $r_i$, may be stored in the memory 112 for use in subsequent computations.

In step S210 a second computation is performed for the current iteration with the multiplier logic 110 to determine a second intermediate parameter, $s_i$, based on a multiplication of the first intermediate parameter, $r_i$, with the value $p_i$ which is the previous approximation of $$\frac{1}{\sqrt{b}}.$$

For example, the second intermediate parameter, $s_i$, may be determined according to the equation:

$$s_i = \frac{3 - r_i p_i}{2}. \tag{8}$$

The determined value of the second intermediate parameter, $s_i$, may be stored in the memory 112 for use in subsequent computations.

In step S212 it is determined whether the current iteration is a concluding iteration or not, by determining whether i<c. For non-concluding iterations, i.e. where i<c, the method passes to step S214.

In step S214 a third computation is performed for the current iteration with the multiplier logic 110 to determine a refined approximation of $$\frac{1}{\sqrt{b}},$$

denoted $p_{i+1}$, which is for use in a subsequent iteration, based on a multiplication of the second intermediate parameter, $s_i$, with the value $p_i$ which is the previous approximation of $$\frac{1}{\sqrt{b}}.$$

For example, the refined approximation, $p_{i+1}$, may be determined according to the equation:

$$p_{i+1} = s_i p_i. \tag{9}$$

The refined approximation of $$\frac{1}{\sqrt{b}},$$

$$p_i + 1,$$

may be stored in the memory 112 for use in subsequent iterations.

It can be appreciated that the three computations shown by the equations 7, 8 and 9 provide the result for $p_{i+1}$ in accordance with equation 6, but each of the three computations is suitable for being performed in a binary multiplier of the multiplier logic 110. In particular, binary multipliers are often capable of multiplying two (but not more than two) numbers together in a single computation. Each of the computations performed in steps S208, S210 and S214 comprise multiplying two numbers together. In this example, step S210 also comprises a subtraction and a shift (i.e. a divide by two), but these processes can be approximated after the multiplication performed in that step. Each of the three computations of an iteration may comprise some number of clock cycles (e.g. 3, 4 or 5 clock cycles) to complete.

When a refined approximation, $p_{i+1}$, has been determined then, in step S216, a new iteration can be started and the index i is incremented (i.e. i=i+1). The method then passes back to step S208 and the method proceeds from that point as described above.

The control module 108 determines the number of iterations that are to be performed and sets the value of c to reflect this. As an example, the control module 108 may control the number of iterations of the iterative converging approximation technique which are to be performed based on: (i) the number of bits of accuracy of the initial approximation of $$\frac{1}{\sqrt{b}},$$

$$p_0,$$

and (ii) a desired number of bits of accuracy of the determined value of $\sqrt{b}$.

The Newton-Raphson method of finding the reciprocal square root, using the above equations, provides a convergence that is quadratic. That is, each iteration approximately doubles the accuracy of the approximation. This can be seen as follows. An approximation $p_i$ is not an exact result, so $$p_i \neq \frac{1}{\sqrt{b}},$$

and instead there is some error, $\varepsilon_i$, in the approximation such that $$p_i + \varepsilon_i = \frac{1}{\sqrt{b}}.$$

The error, $\varepsilon_i$, may be positive or negative. Therefore $p_i$ can be written as:

$$p_i = \frac{1}{\sqrt{b}} - \varepsilon_i. \qquad (10)$$

From equation 10 and equations 7, 8 and 9, it follows that:

$$r_i = \sqrt{b} - \varepsilon_i b. \qquad (11)$$

$$s_i = 1 + \varepsilon_i \sqrt{b} - \frac{\varepsilon_i^2 b}{2}. \qquad (12)$$

$$p_{i+1} = \frac{1}{\sqrt{b}} - \frac{\varepsilon_i^2 \sqrt{b}}{2}(3 - \varepsilon_i \sqrt{b}). \qquad (13)$$

As described above, a scaling operation may be performed such that $1 \leq b < 4$, and a good initial approximation is assumed such that the approximation $p_0$ has at least three bits of accuracy such that $|\varepsilon_0| < 2^{-3}$. Therefore, $(3 - \varepsilon_i \sqrt{b})$ is positive, and so is $$\frac{\varepsilon_i^2 \sqrt{b}}{2}.$$

Therefore, $$p_{i+1} < \frac{1}{\sqrt{b}}.$$

It is useful to ensure that the approximations of $$\frac{1}{\sqrt{b}}$$

are not larger than the true value of $$\frac{1}{\sqrt{b}},$$

because a check procedure performed by the check logic 106 (described below with reference to step S220) may rely on an assumption that the determined value for $\sqrt{b}$ is less than the true value of $\sqrt{b}$ in order to check that the value for $\sqrt{b}$ is correctly rounded. The error $\varepsilon_{i+1}$ in the approximation $p_{i+1}$ is given by:

$$\varepsilon_{i+1} = \frac{\varepsilon_i^2 \sqrt{b}}{2}(3 - \varepsilon_i \sqrt{b}).$$

Since $p_{i+1}$ differs from $$\frac{1}{\sqrt{b}}$$

by about $\varepsilon_i^2$ (whereas $p_i$ differs from $$\frac{1}{\sqrt{b}}$$

by $\varepsilon_i$) it can be appreciated that $p_{i+1}$ has about twice as many bits of accuracy as $p_i$. For example, if the initial approximation, $p_0$, has 7 bits of accuracy, then $p_1$ would have about 14 bits of accuracy, $p_2$ would have about 28 bits of accuracy (enough for single precision floating point), and $p_3$ would have about 56 bits of accuracy (enough for double precision floating point).

As an example, the control module 108 may determine that the desired result is a single precision floating point number, for which at least 24 bits of accuracy are desired, and that the initial approximation, $p_0$, has 7 bits of accuracy. In that case, the controller sets c=1, such that two iterations are performed, and therefore in a simple example six computations may be performed to determine $p_2$. In this simple example, at the end of the second iteration the value of $p_2$ could be multiplied by b in order to determine a value of $\sqrt{b}$, i.e. result=$bp_2$, such that seven computations are performed to determine a value of $\sqrt{b}$.

As another example, the control module 108 may determine that the desired result is a double precision floating point number, for which at least 53 bits of accuracy are desired, and that the initial approximation, $p_0$, has 7 bits of accuracy. In that case, the controller sets c=2, such that three iterations are performed, and therefore in a simple example nine computations may be performed to determine $p_3$. In this simple example, at the end of the third iteration the value of $p_3$ could be multiplied by b in order to determine a value of $\sqrt{b}$, i.e. result=$bp_3$, such that ten computations are performed to determine a value of $\sqrt{b}$.

However, the number of computations performed to determine a value of $\sqrt{b}$ can be reduced compared to the simple examples described in the two preceding paragraphs. This is achieved by implementing the concluding iteration without determining a refined approximation of $$\frac{1}{\sqrt{b}}$$

on the concluding iteration.

On the final iteration, i.e. the concluding iteration, then the control module 108 has set c such that i=c. Steps S208 and S210 are performed as above in accordance with equations 7 and 8. That is, in step S208 on the final iteration, the first computation is performed with the multiplier logic 110 to determine a first intermediate parameter $r_c$ for the concluding iteration based on a multiplication of the input value b with a previous approximation of $$\frac{1}{\sqrt{b}},$$

i.e. $p_c$. For example the first intermediate parameter $r_c$ for the concluding iteration may be given by the equation:

$$r_c = b p_c. \qquad (14)$$

Furthermore, in step S210 on the final iteration, the second computation is performed with the multiplier logic 110 to determine a second intermediate parameter $s_c$ for the concluding iteration based on a multiplication of the first intermediate parameter $r_c$ for the concluding iteration with the previous approximation of $$\frac{1}{\sqrt{b}},$$

i.e. $p_c$. For example the second intermediate parameter $s_c$ for the concluding iteration may be given by the equation:

$$s_c = \frac{3 - r_c p_c}{2}. \quad (15)$$

Then in step S212 it is determined that i is not less than c because this is the final iteration so i=c. Therefore the method passes from step S212 to step S218. In step S218, instead of determining a refined approximation of $$\frac{1}{\sqrt{b}},$$

i.e. $p_{c+1}$, a concluding computation is performed with the multiplier logic 110 to determine the value of $\sqrt{b}$ based on a multiplication of the first intermediate parameter $r_c$ for the concluding iteration with the second intermediate parameter $s_c$ for the concluding iteration. For example the value of $\sqrt{b}$ (denoted "result") may be determined according to the equation:

$$\text{result} = r_c s_c. \quad (16)$$

In this way, the two steps from the simple example described above of: (i) determining $p_{c+1}$ as $p_{c+1} = s_c p_c$, and then (ii) determining the result as result=$bp_{c+1}$, are reduced into one step as given by equation 16. The following equation shows that this reduction is valid:

$$\text{result} = bp_{c+1} = bs_c p_c = bp_c s_c = r_c s_c. \quad (17)$$

Reducing the number of computations which are performed in the final iteration can provide a significant benefit. Each computation takes a number of clock cycles (e.g. 3, 4 or 5 clock cycles) to be performed. So reducing the number of computations that are performed on the final iteration reduces the time taken to determine the value of $\sqrt{b}$. This means that the latency is reduced, i.e. the result can be provided sooner. Furthermore, reducing the number of computations which are performed reduces the power that is consumed to determine the value of $\sqrt{b}$.

The value of $\sqrt{b}$ determined in step S218 is outputted from the iterative converging approximation module 104 to the check logic 106. In step S220, the check logic 106 may perform a check procedure on the determined value of $\sqrt{b}$ in accordance with a rounding mode to check that the determined value of $\sqrt{b}$ is correct in accordance with the rounding mode. The rounding mode may for example be a round up mode, a round down mode or a round to nearest mode. Details of the check procedure performed by the check logic 106 are beyond the scope of this disclosure, but it is noted that the check procedure may rely on an assumption that the determined value of $\sqrt{b}$ is not greater than the exactly correct value of $\sqrt{b}$. The output from the check logic 106 is either the same as the value of $\sqrt{b}$ received from the iterative converging approximation module 104 or is that value incremented by one unit of least precision (ULP) (i.e. the value of $\sqrt{b}$ received from the iterative converging approximation module 104 with the least significant digit incremented by one).

In step S222 the resulting value for $\sqrt{b}$ is outputted from the check logic 106 as the output of the computer system 100. The outputted value of $\sqrt{b}$ may be put to any suitable use after it has been outputted, e.g. stored in a memory or used in subsequent computations, etc.

In some examples, the check logic 106 might not be implemented in the system 100. That is, the check procedure might not be performed in some examples. In those examples, the value of $\sqrt{b}$ determined by the iterative converging approximation module 104 is outputted from the system 100 and used to represent the value of $\sqrt{b}$.

The accuracy of the iterations is now considered. The multiplier logic 110 may be configured to take two k-bit values as input and provide a 2k-bit result. For example, if b and $p_i$ both have k bits then in the first computation when $bp_i$ is computed, the result $r_i$ has twice as many bits (2k) as each of the inputs. However, when $r_i$ is used as an input to the next computation in computing $r_i p_i$, it may only contain k bits. So, the k least significant bits of $r_i$ are removed and the k most significant bits are rounded up or down before being used in the next computation. This rounding may introduce additional error terms. In particular, the first intermediate parameter $r_i$ has an error, $\alpha$, introduced by rounding, such that equation 11 becomes:

$$r_i = \sqrt{r} - \epsilon_i b + \alpha. \quad (18)$$

In order to round $r_i$ up, $\alpha$ would be positive; and in order to round $r_i$ down, $\alpha$ would be negative. The second intermediate parameter $s_i$ has an error, $\beta$, introduced by rounding, and using equations 8, 10 and 18, $s_i$ is given by:

$$s_i = \frac{3 - r_i p_i}{2} + \beta = \frac{3 - (\sqrt{b} - \epsilon_i b + \alpha)\left(\frac{1}{\sqrt{b}} - \epsilon_i\right)}{2} + \beta = \quad (19)$$

$$1 + \epsilon_i \sqrt{b} - \frac{\epsilon_i^2 b}{2} - \frac{\alpha}{2}\left(\frac{1}{\sqrt{b}} - \epsilon_i\right) + \beta.$$

In order to round $s_i$ up, $\beta$ would be positive; and in order to round $s_i$ down, $\beta$ would be negative.

On the concluding iteration, the determined value for $\sqrt{b}$ is computed with an error, $\delta$, introduced by rounding. Using equations 16, 18 and 19 result is given by:

$$\text{result} = r_c s_c + \delta \quad (20)$$

result =

$$(\sqrt{b} - \epsilon_c b + \alpha)\left(1 + \epsilon_c \sqrt{b} - \frac{\epsilon_c^2 b}{2} - \frac{\alpha}{2}\left(\frac{1}{\sqrt{b}} - \epsilon_c\right) + \beta\right) + \delta$$

$$\text{result} = \sqrt{b} + \epsilon_c b - \frac{\epsilon_c^2 b \sqrt{b}}{2} - \frac{\alpha}{2} + \frac{\alpha \epsilon_c \sqrt{b}}{2} + \beta\sqrt{b} -$$

$$\epsilon_c b - \epsilon_c^2 b \sqrt{b} + \frac{\epsilon_c^3 b^2}{2} + \frac{\alpha \epsilon_c \sqrt{b}}{2} - \frac{\alpha \epsilon_c^2 b}{2} - \beta \epsilon_c b +$$

$$\alpha + \alpha \epsilon_c \sqrt{b} - \frac{\alpha \epsilon_c^2 b}{2} - \frac{\alpha^2}{2\sqrt{b}} + \frac{\alpha^2 \epsilon_c}{2} + \alpha\beta + \delta$$

$$\text{result} = \sqrt{b} - \frac{\epsilon_c^2 b \sqrt{b}}{2}(3 - \epsilon_c \sqrt{b}) +$$

$$\alpha\left(\frac{1}{2} - \frac{\alpha}{2\sqrt{b}} + \epsilon_c b\left(\frac{2}{\sqrt{b}} - \epsilon_c\right) + \frac{\alpha \epsilon_c}{2}\right) + \beta(\sqrt{b} + \alpha - \epsilon_c b) + \delta$$

As described above, for the check procedure to work correctly, the result should not be greater than $\sqrt{b}$. To ensure this, on the final iteration, $r_c$, $s_c$ and result are rounded down, i.e. $\alpha$, $\beta$ and $\delta$ are set to be negative. On non-concluding iterations the rounding of, $r_i$, $s_i$ and $p_{i+1}$ does not need to be constrained to any particular rounding mode, but it may be simpler to use a round down mode since this is used on the concluding iteration. On the concluding iteration, the error $\epsilon_c$ is small because this is the error in the previous approximation $p_c$. For example, for a single precision result, on the final iteration, $|\epsilon_c|<2^{-24}$ and for a double precision result, on the final iteration, $|\epsilon_c|<2^{-53}$. Also since $\alpha$ and $\beta$ are rounding errors, they have a similar magnitude to $\epsilon_c$, so for a single precision result, on the final iteration, $0 \geq \alpha > -2^{-24}$ and $0 \geq \beta > 2^{-24}$, and for a double precision result, on the final iteration, $0 \geq \alpha > -2^{-53}$ and $0 \geq \beta > -2^{-53}$. Furthermore, as described above, $1 \leq b < 4$, such that $1 \leq \sqrt{b} < 2$. Therefore each term in equation 20 after $\sqrt{b}$ is negative since $\alpha$, $\beta$ and $\epsilon_c$ are all tiny compared to 3, ½ and $\sqrt{b}$. Therefore, the result determined in equation 20 is smaller than $\sqrt{b}$ such that it is suitable for the check procedure. This is true irrespective of whether $\epsilon_c$ is positive or negative, which is why it is not important to constrain the rounding performed in the non-concluding iterations.

In the examples described above, on non-concluding iterations, a refined approximation $p_{i+1}$ is determined according to equation 6 using the three computations as set out in equations 7 to 9. In an alternative method, in step S208, the first computation is performed in the same way as described above for a current iteration with the multiplier logic 110. That is, a first intermediate parameter, $r_i$, may be determined according to the equation:

$$r_i = bp_i. \quad (21)$$

The determined value of the first intermediate parameter, $r_i$, may be stored in the memory 112 for use in subsequent computations.

In the alternative method, in step S210, as described above, a second computation is performed for the current iteration with the multiplier logic 110 to determine a second intermediate parameter, $s_i$, based on a multiplication of the first intermediate parameter, $r_i$ with the value $p_i$ which is the previous approximation of $$\frac{1}{\sqrt{b}}.$$

However, in contrast to equation 8 given above, in the alternative method the second intermediate parameter, $s_i$, may be determined according to the equation:

$$s_i = \frac{1 - r_i p_i}{2}. \quad (22)$$

The determined value of the second intermediate parameter, $s_i$, may be stored in the memory 112 for use in subsequent computations.

Then for non-concluding iterations, in step S214, a third computation is performed for the current iteration with the multiplier logic 110 to determine a refined approximation of $$\frac{1}{\sqrt{b}},$$

denoted $p_{i+1}$, which is for use in a subsequent iteration, based on a multiplication of the second intermediate parameter, $s_i$, with the value $p_i$ which is the previous approximation of $$\frac{1}{\sqrt{b}}.$$

In an alternative method, the refined approximation, $p_{i+1}$, may be determined according to the equation:

$$p_{i+1} = s_i p_i + p_i. \quad (23)$$

The refined approximation of $$\frac{1}{\sqrt{b}}, p_{i+1},$$

may be stored in the memory 112 for use in subsequent iterations.

For concluding iterations, in step S218, a concluding computation is performed with the multiplier logic 110 to determine the value of $\sqrt{b}$ based on a multiplication of the first intermediate parameter $r_c$ for the concluding iteration with the second intermediate parameter $s_c$ for the concluding iteration. In the alternative method, the result may be determined according to the equation:

$$\text{result} = r_c s_c + r_c. \quad (24)$$

This alternative method has the same advantages as the method described in detail above. In particular, the final iteration avoids a computation to determine a refined approximation of $$\frac{1}{\sqrt{b}}.$$

As described above, reducing the number of computations that are performed on the final iteration has benefits in terms of the power consumption and latency of the system 100 in determining the value of $\sqrt{b}$.

By way of explanation, equation 24 has the same result as performing two computations: (i) determining $p_{c+1}$ as $p_{c+1} = s_c p_c + p_c$, and then (ii) determining the result as $\text{result} = bp_{c+1}$. This is shown in the following equation:

$$\text{result} = bp_{c+1} = bs_c p_c + bp_c = r_c s_c + r_c. \quad (25)$$

In the alternative method, all operations typically use fused multiply-add operations with the requested rounding mode for the final result, in which case no check procedure is needed.

In the examples described above, a plurality of iterations of the iterative converging approximation technique are performed (i.e. $c \geq 1$), such that a refined approximation of $$\frac{1}{\sqrt{b}}$$

determined in the iteration preceding the final iteration is used as a previous approximation of $$\frac{1}{\sqrt{b}}$$

in the concluding iteration. However, in other examples, only one iteration of the iterative converging approximation technique may be performed, such that the first iteration is the concluding iteration (i.e. c=0) and the initial approximation of $$\frac{1}{\sqrt{b}}$$

is used as the previous approximation of $$\frac{1}{\sqrt{b}}$$

in the concluding iteration.

Figure 3:
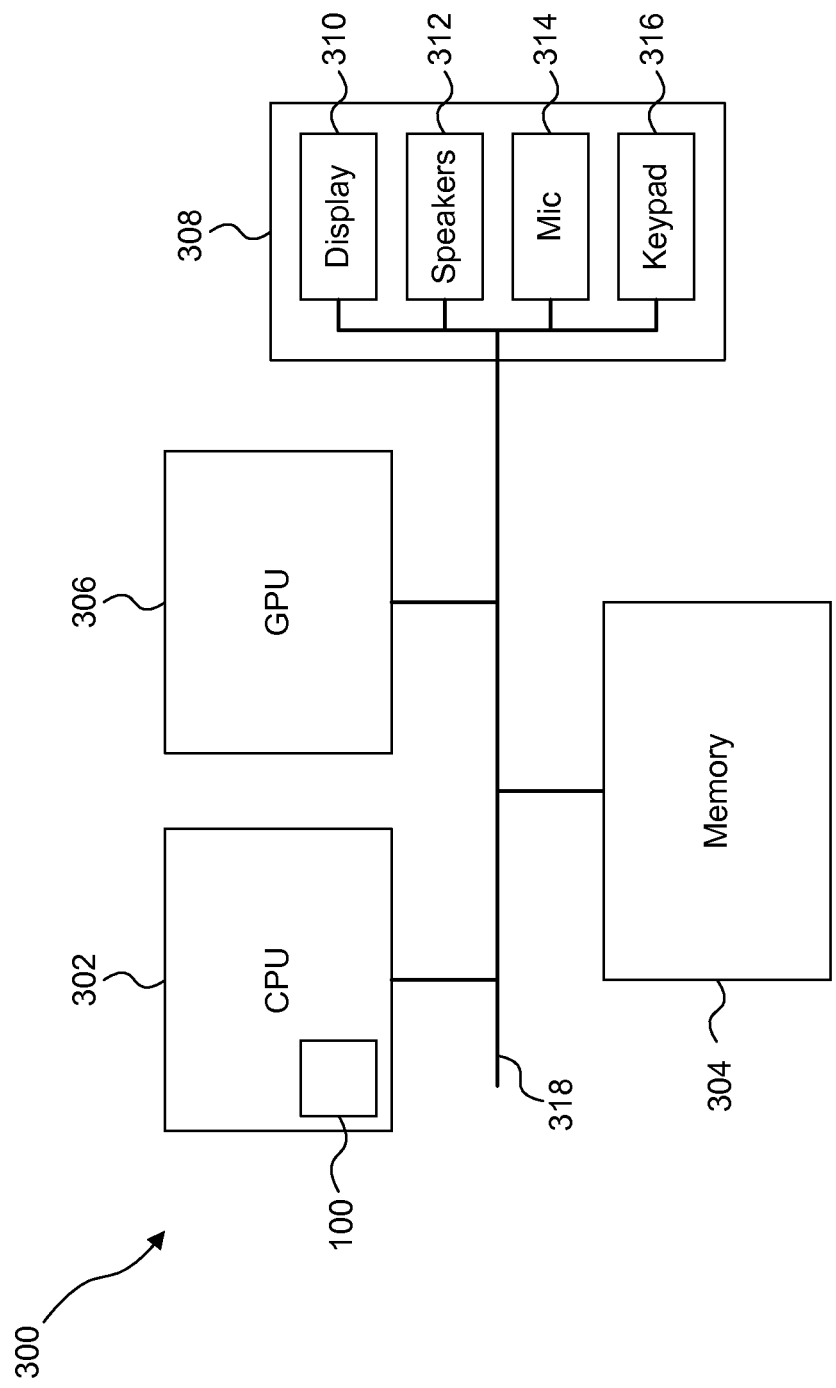
FIG. 3 shows a high-level representation of a computer system.

The computing system 100 described above with reference to FIG. 1 can be implemented as a unit at a processor in a larger computer system. For example, FIG. 3 shows a larger computer system 300 which comprises a processor 302 on which the system 100 is implemented. The processor 302 is a central processing unit (CPU). In the example shown in FIG. 3, the computer system 300 also comprises a memory 304, a graphics processing unit (GPU) 306 and other devices 308, such as a display 310, speakers 312, a microphone 314 and a keypad 316. The components of the computer system 300 can communicate with each other via a communications bus 318. In other examples, the system 100 may be implemented as a unit on the GPU 306 as well as or instead of being implemented as a unit on the CPU 302. When a square root operation is to be performed, an input value b can be provided to the unit 100 and the unit 100 operates as described above to output a value of $\sqrt{b}$, which can then be used in the system 300 as appropriate.

Examples are described above, by way of example only, of a computer system which is configured to implement a square root operation using an iterative converging approximation technique in a manner which has low latency and low power consumption. For example, the number of computations is lower than might be expected. This results in a faster method which uses less power than conventional methods, and the method may be implemented in hardware which is smaller and simpler to implement than conventional hardware for implementing square root operations.

The terms 'module', 'block' and 'logic' are used herein to generally represent hardware, including fixed function hardware, configurable hardware, programmable hardware, and combinations thereof. Firmware, software, or some combination thereof can be used to configure and/or program such hardware.

In one example, the methods described may be performed by a computer configured with software in machine readable form stored on a computer-readable medium. The computer-readable medium may be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code. The program code can be stored in one or more computer readable media. The features of the techniques described herein are platform-independent, meaning that the techniques may be implemented on a variety of computing platforms having a variety of processors.

Those skilled in the art will realize that all, or a portion of the functionality, techniques, logic or methods may be carried out by a dedicated circuit, an application-specific integrated circuit, a programmable logic array, a field-programmable gate array, or the like. For example, the module, block, unit or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, block, unit or logic (e.g. the components shown in FIG. 1) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, block, unit or logic described above, such as HDL (hardware description language) software, as is used for designing integrated circuits, or for configuring programmable chips, to carry out desired functions. That is, there may be provided a computer readable storage medium having encoded thereon computer readable program code for generating a computer system (e.g. computer hardware) configured to perform any of the methods described herein, or for generating a computer system (e.g. computer hardware) comprising any apparatus described herein. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of implementing a square root operation in a computer system to determine a value of $\sqrt{b}$, where b is an input value, comprising:

obtaining an initial approximation of $$\frac{1}{\sqrt{b}}$$

denoted as $p_0$; and for iterations in which an iteration index i=0, . . . , c, c being a predetermined number greater than or equal to 0:

(i) performing a first computation using multiplier logic of the computer system to determine a first intermediate parameter $r_i$ based on a multiplication of the input value b with $p_i$;

(ii) performing a second computation using the multiplier logic to determine a second intermediate parameter $s_i$ based on a multiplication of the first intermediate parameter $r_i$ with $p_i$;

(iii) when i<c, computing a refined approximation of $$\frac{1}{\sqrt{b}}$$

denoted as $p_{i+1}$ using the multiplier logic based on a multiplication of the second intermediate parameter $s_i$ with $p_i$, incrementing i, and repeating steps (i) and (ii); and (iv) when i=c, computing with the multiplier logic the value of $\sqrt{b}$ based on a multiplication of first intermediate parameter $r_c$ with second intermediate parameter $s_c$.

2. The method of claim 1 wherein computing an initial approximation comprises:

(i) performing a first computation with the multiplier logic of the computer system to determine a first intermediate parameter $r_i$ for the current iteration based on a multiplication of the input value b with a previous approximation of $$\frac{1}{\sqrt{b}};$$

(ii) performing a second computation with the multiplier logic to determine a second intermediate parameter $s_i$, for the current iteration based on a multiplication of the first intermediate parameter $r_i$ for the current iteration with the previous approximation of $$\frac{1}{\sqrt{b}};$$

and (iii) performing a third computation with the multiplier logic to determine a refined approximation of $$\frac{1}{\sqrt{b}}$$

for use in a subsequent iteration based on a multiplication of the second intermediate parameter $s_i$ for the current iteration with the previous approximation of $$\frac{1}{\sqrt{b}}.$$

3. The method of claim 1 wherein:

the first computation comprises determining the first intermediate parameter $r_i$ in accordance with the equation $r_i = bp_i$ $$\frac{1}{\sqrt{b}};$$

the second computation comprises determining the second intermediate parameter $s_c$ in accordance with the equation $$s_c = \frac{1}{2}(1 - r_c p_c);$$

and the computation when i=c comprises determining the value of $\sqrt{b}$, denoted result, in accordance with the equation result=$r_c s_c$.

4. The method of claim 1 wherein:

the first computation comprises determining the first intermediate parameter $r_c$ in accordance with the equation $r_i = bp_i$ $$\frac{1}{\sqrt{b}};$$

the second computation comprises determining the second intermediate parameter $s_i$ in accordance with the equation $$s_i = \frac{1}{2}(1 - r_i p_i);$$

and the computation when i=c comprises determining the value of $\sqrt{b}$, denoted result, in accordance with the equation result=$r_i s_i + r_i$.

5. The method of claim 1 further comprising scaling an initial input value by an even power of two to determine the input value b such that 1≤b<4.

6. A computer system configured to implement a square root operation to determine a value of $\sqrt{b}$, where b is an input value, the computer system comprising multiplier logic configured to;
for iterations in which an iteration index i=0, . . . , c, c being a predetermined number greater than or equal to 0:
(i) perform a first computation to determine a first intermediate parameter $r_i$ based on a multiplication of the input value b with a previous approximation of $$\frac{1}{\sqrt{b}}$$

denoted as $p_i$;
(ii) perform a second computation to determine a second intermediate parameter $s_i$ based on a multiplication of the first intermediate parameter $r_i$ with $p_i$
(iii) when i<c, computing a refined approximation of $$\frac{1}{\sqrt{b}}$$

denoted as $p_{i+1}$ based on a multiplication of the second intermediate parameter $s_i$ with $p_i$, incrementing i, and repeating steps (i) and (ii), and
(iv) when i=c determining the value of $\sqrt{b}$ based on a multiplication of first intermediate parameter $r_c$ with second intermediate parameter $s_c$.

7. A non-transitory computer readable storage medium having stored thereon computer executable instructions that when executed cause at least one processor to perform the method as set forth in claim 1.

8. The computer system of claim 6 further comprising:
a memory for storing at least the first intermediate parameter $r_i$ and the previous approximation of $$\frac{1}{\sqrt{b}}$$

$p_i$; and
a control module configured to control which values are provided to the multiplier logic for the respective computations.

9. The computer system of claim 8 wherein the control module is further configured to control the number of iterations which are implemented based on: (i) the number of bits of accuracy of the initial approximation of $$\frac{1}{\sqrt{b}},$$

and (ii) a desired number of bits of accuracy of the determined value of $\sqrt{b}$.

10. The computer system of claim 6 wherein to implement at least iteration multiplier logic is configured to:

(i) perform a first computation to determine a first intermediate parameter $r_i$ for the current iteration based on a multiplication of the input value b with a previous approximation of $$\frac{1}{\sqrt{b}};$$

(ii) perform a second computation to determine a second intermediate parameter $s_i$ for the current iteration based on a multiplication of the first intermediate parameter $r_i$ for the current iteration with the previous approximation of $$\frac{1}{\sqrt{b}};$$

and
(iii) perform a third computation to determine a refined approximation of for use in a subsequent iteration based on a multiplication of the second intermediate parameter $s_i$ for the current iteration with the previous approximation of $$\frac{1}{\sqrt{b}}.$$

11. The computer system of claim 6 wherein the multiplier logic is configured to perform three computations for each of one or more iterations.

12. The computer system of claim 6 wherein the multiplier logic is configured to implement a concluding iteration without determining a refined approximation of $$\frac{1}{\sqrt{b}}$$

on the concluding iteration.

13. The computer system of claim 6 wherein the multiplier logic is configured such that:
the first computation comprises determining the first intermediate parameter $r_c$ in accordance with the equation $r_c = bp_c$ where $p_c$ is the previous approximation of $$\frac{1}{\sqrt{b}};$$

the second computation comprises determining the second intermediate parameter $s_c$ in accordance with the equation $$s_c = \frac{1}{2}(3 - r_c p_c);$$

and the computation when i=c comprises determining the value of $\sqrt{b}$, denoted result, in accordance with the equation result=$r_c s_c$.

14. The computer system of claim 6 wherein the multiplier logic is configured such that for a concluding iteration:
the first computation comprises rounding down to determine the first intermediate parameter $r_c$;
the second computation comprises rounding down to determine the second intermediate parameter $s_c$; and
the concluding computation comprises rounding down to determine the value of $\sqrt{b}$.

15. The computer system of claim 6 further comprising check logic which is configured to:
receive the determined value of $\sqrt{b}$; and
perform a check procedure on the determined value of $\sqrt{b}$ in accordance with a rounding mode to check that the determined value of $\sqrt{b}$ is correct in accordance with the rounding mode.

16. The computer system of claim 6 wherein the multiplier logic is configured such that:
the first computation comprises determining the first intermediate parameter $r_c$ in accordance with the equation $r_c = bp_c$ where $p_c$ is the previous approximation of $$\frac{1}{\sqrt{b}};$$

the second computation comprises determining the second intermediate parameter $s_c$ in accordance with the equation $$s_c = \frac{1}{2}(1 - r_c p_c);$$

and
the computation when i=c comprises determining the value of $\sqrt{b}$, denoted result, in accordance with the equation result=$r_c s_c + r_c$.

17. The computer system of claim 6 further comprising initial approximation logic configured to:
obtain the initial approximation of $$\frac{1}{\sqrt{b}}$$

by: (i) computing the initial approximation of $$\frac{1}{\sqrt{b}}$$

or (ii) receiving the initial approximation of $$\frac{1}{\sqrt{b}};$$

and
provide the obtained initial approximation of $$\frac{1}{\sqrt{b}}$$

to the multiplier logic.

18. A non-transitory computer readable storage medium having stored thereon computer readable code that when processed by an integrated circuit manufacturing system causes the integrated circuit manufacturing system to generate a computer system according to claim 6.

* * * * *